Sept. 11, 1962 H. F. MULVANEY 3,052,942
RELEASABLE FASTENING ASSEMBLY
Filed June 1, 1960
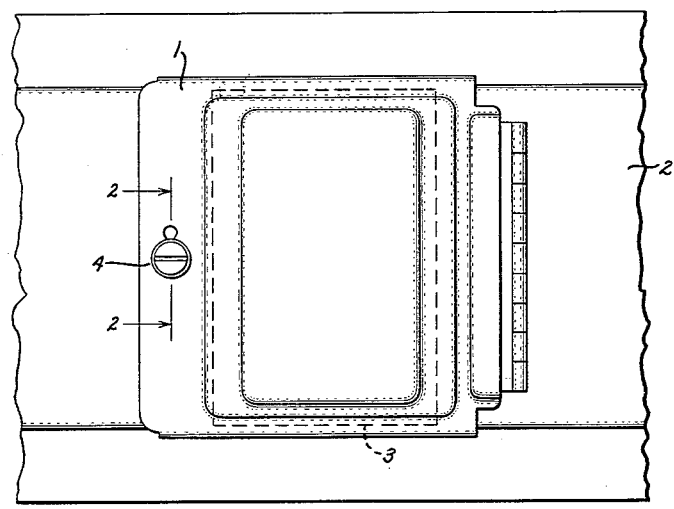
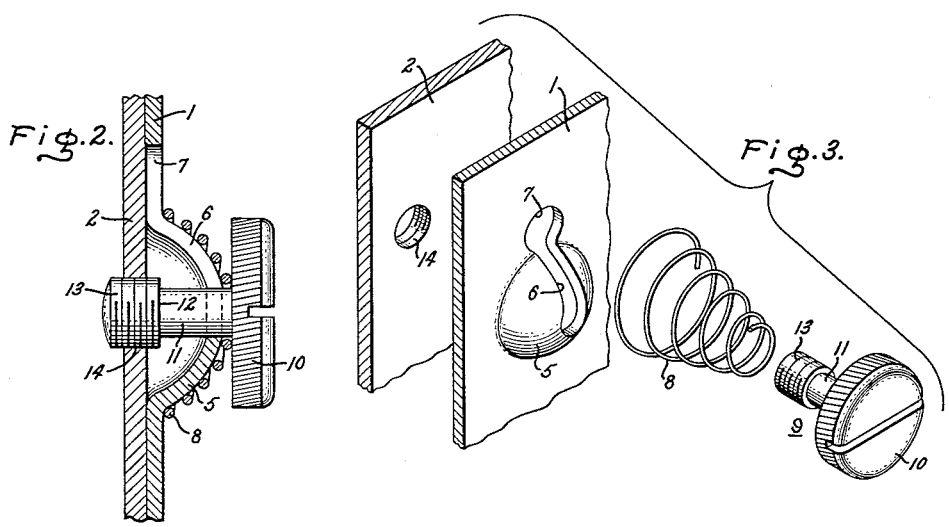
Inventor:
Henry F. Mulvaney,
by William D Roberson
Attorney.

United States Patent Office 3,052,942
Patented Sept. 11, 1962

3,052,942
RELEASABLE FASTENING ASSEMBLY
Henry F. Mulvaney, West Hartford, Conn., assignor to General Electric Company, a corporation of New York
Filed June 1, 1960, Ser. No. 33,309
5 Claims. (Cl. 24—224)

This invention relates generally to fastening devices and more particularly to a releasable fastening assembly for doors, covers or the like.

Covers for access openings in electrical equipment housings or the like are usually provided with releasable fastening devices to permit entry to the interior of the housing when desired and to close off the opening at other times. In their simplest forms such devices may constitute nothing more than a screw inserted through aligned openings in the cover and the housing. To prevent loss of the screw or other fastening element, means are often provided in the form of an additional element or elements attachable to the cover to hold the fastening element captive when the cover is open. Among the problems faced in making a simple and foolproof captive fastener, are the requirements of a small number of component parts, ease of assembly, and provisions for substituting a new fastener in case the old one becomes worn.

It is a principal object of the present invention to provide an improved captive fastening arrangement that is economical to manufacture and simple to use.

It is also an object of this invention to provide an improved captive fastener arrangement which can be assembled and disassembled without tools.

Briefly stated, in carrying out the invention in a preferred form, the cover member to which the fastener is made captive is provided with a protrusion with a slot extending from the apex thereof having an enlargement spaced from the apex. The fastener is manufactured with a head and a stem, with the stem enlarged at a point displaced from the head. In affixing the fastener to be captive to the cover member, the fastener stem is placed through a spring which is interposed between the protrusion and the head of the fastener, and the stem is inserted into the slot at the point where the slot is enlarged. Then the fastener and resilient means are slid along the slot until the resilient means settles over the protrusion with the enlarged portion of the stem captive behind the non-enlarged portion of the slot.

The invention will be better understood from the following more detailed description taken in connection with the accompanying drawings wherein:

FIG. 1 is a plan view of a cover hinged to a receptacle and employing a releasable fastening assembly constructed according to the present invention;

FIG. 2 is a section on line 2—2 of FIG. 1; and

FIG. 3 is a perspective exploded view of the components of the fastening assembly.

Referring now to FIG. 1 of the drawings, a cover or door 1 formed of a generally planar plate member is shown attached by a hinge at one end to a receptacle 2 so as to cover an access opening 3 in the receptacle. At the opposite end of the cover is a captive fastener, generally indicated at 4, according to the invention.

Referring next to FIGS. 2 and 3, the same numerals used in describing FIG. 1 are used to indicate the corresponding elements. The plate member 1 is formed with a protrusion 5 convex on the outer surface and concave on the inner surface. The protrusion is shown here as having a somewhat hemispherical or conical shape, although other shapes of protrusions could be used. Beginning generally near the top or apex of the protrusion 5 is a slot 6 which runs down the side of the protrusion. At some point, displaced from the apex, this slot is provided with an enlargement 7 which is shown here as being at the base of the protrusion 5.

A spring 8 is provided which is preferably generally conical to conform to the shape of the protrusion when compresed as shown in FIG. 2.

The fastener itself is shown, for purposes of example, as a screw 9; however, other headed fasteners with a shoulder or enlargement could be utilized. The fastener is formed with a head portion 10, and a stem having a diameter at the area 11 small enough to fit in the slot 6 and a shoulder 12 having a diameter just large enough to pass through the enlarged portion 7 of the slot 6, but too large to pass through remaining portions of the slot 6. Where the fastener is a screw, the fastening portion 13 is provided with threads to mate with a correspondingly threaded opening 14 in the receptacle member. Of course the head of the screw may have a knurled edge and may be provided with a tool receiving slot as shown. When the cover is open and the threaded portion 13 is disengaged from the threaded opening 14, the shoulder of the screw stem is biased against the concave inner surface of the protrusion by the spring so that the assembly does not dissociate when the members are separate. In addition this spring dampens vibrations when the two members are joined.

In assembling the elements of the fastener, the stem of the fastener 9 is passed through the spring 8 and into the enlarged portion 7 of the slot. The spring is then compressed until the shoulder 12 has passed through the plate member 1, and the fastener and spring are then moved along the slot 6 until the spring seats itself over the protrusion 5. The disassembly follows this procedure in reverse.

It is evident that the simple assembly procedure of this captive fastener arrangement is advantageous both in the initial assembly at the factory and in the field, when it may be desired to replace the fastener. There are no threads in the cover member which might be stripped through long use. Furthermore, should the threads on the fastener become stripped, a new fastener may be applied in replacement without the use of tools.

While a particular embodiment of this captive fastener has been shown and described, it will be obvious that certain changes or modifications may be made in the structure without departing from the invention, and the concluding claims are intended to cover all such changes and modifications as fall within the true spirit and scope of the invention.

What I claim as new and desire to secure by Letters Patent of the United States is:

1. A releasable fastening assembly for releasably joining a plate member to a support, said member having a protrusion with a base and an apex, there being a slot extending from the apex of the protrusion towards the base thereof and having a portion of increased width at a point spaced from the apex of the protrusion, resilient means having an apex and adapted to be seated over the protrusion, and a fastener having a head portion and a stem portion, said stem portion passing through the apex of said resilient means and said protrusion into said slot, with the head portion engaging said resilient means, the lower end of said stem having an enlarged fastening portion for releasable attachment to a support, said fastening portion being of greater width than the slot at the apex of said protrusion and of less width than the increased width of the slot at the point spaced from the apex of the protrusion, whereby the fatsener is captive to said member until the fastener is moved along said slot to the increased width portion to permit withdrawal of the stem from the slot.

2. A releasable fastening assembly for releasably joining a plate member to a support, said member having a protrusion with a base and an apex, there being a slot extending from the apex of the protrusion towards the base thereof and having a portion of increased width at a point spaced from the apex of the protrusion, a spring having an apex and seated over the protrusion, and a screw having a head portion and a stem passing through the apex of said spring and protrusion into said slot with the head portion engaging said spring, the lower end of said stem having an enlarged threaded shoulder portion for threaded engagement with a support, said shoulder portion being of greater width than the slot at the apex of said protrusion and of less width than the increased width of the slot at the point spaced from the apex of the protrusion, whereby the screw is captive to said member until the screw is moved along said slot to the increased width portion to permit withdrawal of the stem from the slot.

3. A releasable fastening assembly for releasably joining a plate member to a support, said member having a protrusion with a base and an apex, there being a slot extending from the apex of the protrusion towards the base thereof and having a portion of increased width at a point near the base of said protrusion, a spring having a base and an apex and seated over the protrusion with its base resting on said member and surrounding the base of said protrusion, and a screw having a head portion and a stem portion, said stem portion passing through the apex of said spring and said protrusion into said slot with the head portion engaging said spring, the lower end of said stem having an enlarged threaded shoulder portion for threaded engagement with a support, said shoulder portion being of greater width than the slot at the apex of said protrusion and of less width than the increased width of the slot at the point near the base of the protrusion, whereby the screw is captive to said member until the screw is moved along said slot to the increased width portion to permit withdrawal of the stem from the slot.

4. A releasable fastening assembly for releasably joining a plate member to a support, said member having a generally conical protrusion with a base and an apex, there being a slot extending from the apex of the protrusion towards the base thereof and having a portion of increased width at a point spaced from the apex of the protrusion, conical resilient means having an apex and adapted to be seated over said protrusion, and a screw having a head portion and a stem portion, said stem portion passing through the apex of said resilient means and said protrusion into said slot, with the head portion of said screw engaging said resilient means, the lower end of said stem portion having an enlarged threaded shoulder portion for threaded engagement with a support, said shoulder portion being of greater width than the slot at the apex of said protrusion and of less width than the increased width of the slot at the point spaced from the apex of the protrusion, whereby the screw is captive to said member until the screw is moved along said slot to the increased width portion to permit withdrawal of the stem from the slot.

5. A fastening assembly for releasably joining a generally planar cover member to a surface comprising a protrusion formed in said cover member to provide a concavity in one surface thereof and a convexity in the opposite surface, said protrusion having an apex and a base and being broader at its base than at its apex, there being a slot extending from the apex of said protrusion to a point in said cover member near the base of said protrusion and having a portion of increased width beyond said base; a fastener having a stem portion passing through said slot, an enlarged head portion on the convex side of said protrusion and an enlarged fastening portion on the concave side of said protrusion for releasable attachment to said surface, said fastening portion being of greater width than the slot at the apex of said protrusion and of less width than the increased width of the slot near the base of said protrusion, and a spring seated on the convex side of said protrusion and compressed against said head portion to urge said fastening portion into said concavity thereby holding said fastener captive, said fastener being movable along said slot against the bias of said spring to the increased width portion to permit withdrawal of said fastener from said slot.

References Cited in the file of this patent

UNITED STATES PATENTS

| | | |
|---|---|---|
| 748,078 | Kaisling | Dec. 29, 1903 |
| 2,098,997 | Bramming | Nov. 16, 1937 |
| 2,393,431 | Torburn | Jan. 22, 1946 |
| 2,640,246 | Shomber | June 2, 1953 |
| 2,770,161 | Schutte | Nov. 13, 1956 |

FOREIGN PATENTS

| | | |
|---|---|---|
| 216,196 | Australia | July 31, 1958 |
| 626,013 | Great Britain | July 7, 1949 |